United States Patent
Amagawa

(10) Patent No.: US 12,429,566 B2
(45) Date of Patent: Sep. 30, 2025

(54) PHOTODETECTOR, DRIVING METHOD OF PHOTODETECTOR, AND DISTANCE MEASURING DEVICE

(71) Applicant: SONY SEMICONDUCTOR SOLUTIONS CORPORATION, Kanagawa (JP)

(72) Inventor: Keitarou Amagawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1100 days.

(21) Appl. No.: 17/423,535

(22) PCT Filed: Jan. 15, 2020

(86) PCT No.: PCT/JP2020/000990
§ 371 (c)(1),
(2) Date: Jul. 16, 2021

(87) PCT Pub. No.: WO2020/153182
PCT Pub. Date: Jul. 30, 2020

(65) Prior Publication Data
US 2022/0120875 A1 Apr. 21, 2022

(30) Foreign Application Priority Data
Jan. 25, 2019 (JP) ................. 2019-011006

(51) Int. Cl.
- *G01S 7/4865* (2020.01)
- *G01S 7/4863* (2020.01)
- *G01S 17/931* (2020.01)

(52) U.S. Cl.
CPC .......... *G01S 7/4865* (2013.01); *G01S 7/4863* (2013.01); *G01S 17/931* (2020.01)

(58) Field of Classification Search
None
See application file for complete search history.

(56) References Cited

U.S. PATENT DOCUMENTS

| | | |
|---|---|---|
| 6,323,942 B1 | 11/2001 | Bamji |
| 6,512,838 B1 | 1/2003 | Rafii et al. |
| (Continued) | | |

FOREIGN PATENT DOCUMENTS

| | | | |
|---|---|---|---|
| EP | 1901093 A1 | 3/2008 | |
| EP | 3816662 A1 * | 5/2021 | ............ G01S 17/08 |
| (Continued) | | | |

OTHER PUBLICATIONS

International Search Report and Written Opinion of PCT Application No. PCT/JP2020/000990, issued on Mar. 17, 2020, 10 pages of ISRWO.

*Primary Examiner* — Eric L Bolda
(74) *Attorney, Agent, or Firm* — CHIP LAW GROUP

(57) ABSTRACT

A photodetector of the present disclosure includes multiple pixels including a light receiving element, and a sampling circuit that is provided corresponding to the multiple pixels, and samples light reception data output from the pixel on the basis of multiple clock signals having different phases, in synchronization with input of a trigger signal. The sampling circuit switches the phase of the clock signal every time a trigger signal is input. Additionally, a distance measuring device of the present disclosure includes a light source that irradiates an object to be measured with light and a photodetector that detects light reflected by the object to be measured. As the photodetector, a photodetector having the above configuration is used.

10 Claims, 14 Drawing Sheets

(56) References Cited

U.S. PATENT DOCUMENTS

| | | |
|---|---|---|
| 6,522,395 B1 | 2/2003 | Bamji et al. |
| 2003/0063775 A1 | 4/2003 | Rafii et al. |
| 2008/0186470 A1 | 8/2008 | Hipp |
| 2012/0062705 A1 | 3/2012 | Ovsiannikov et al. |
| 2018/0259629 A1 | 9/2018 | Oohata et al. |
| 2021/0067168 A1* | 3/2021 | Kitano ................. H04N 25/633 |
| 2022/0057520 A1* | 2/2022 | Mahara ................. G01S 17/931 |

FOREIGN PATENT DOCUMENTS

| | | |
|---|---|---|
| JP | 2003-510561 A | 3/2003 |
| JP | 2008-076390 A | 4/2008 |
| JP | 2016-211881 A | 12/2016 |
| JP | 2017-053833 A | 3/2017 |
| KR | 10-2002-0067032 A | 8/2002 |
| KR | 10-2012-0025052 A | 3/2012 |
| WO | 01/22033 A1 | 3/2001 |
| WO | 02/29711 A2 | 4/2002 |
| WO | 02/057714 A1 | 7/2002 |
| WO | 2017/042993 A1 | 3/2017 |

* cited by examiner

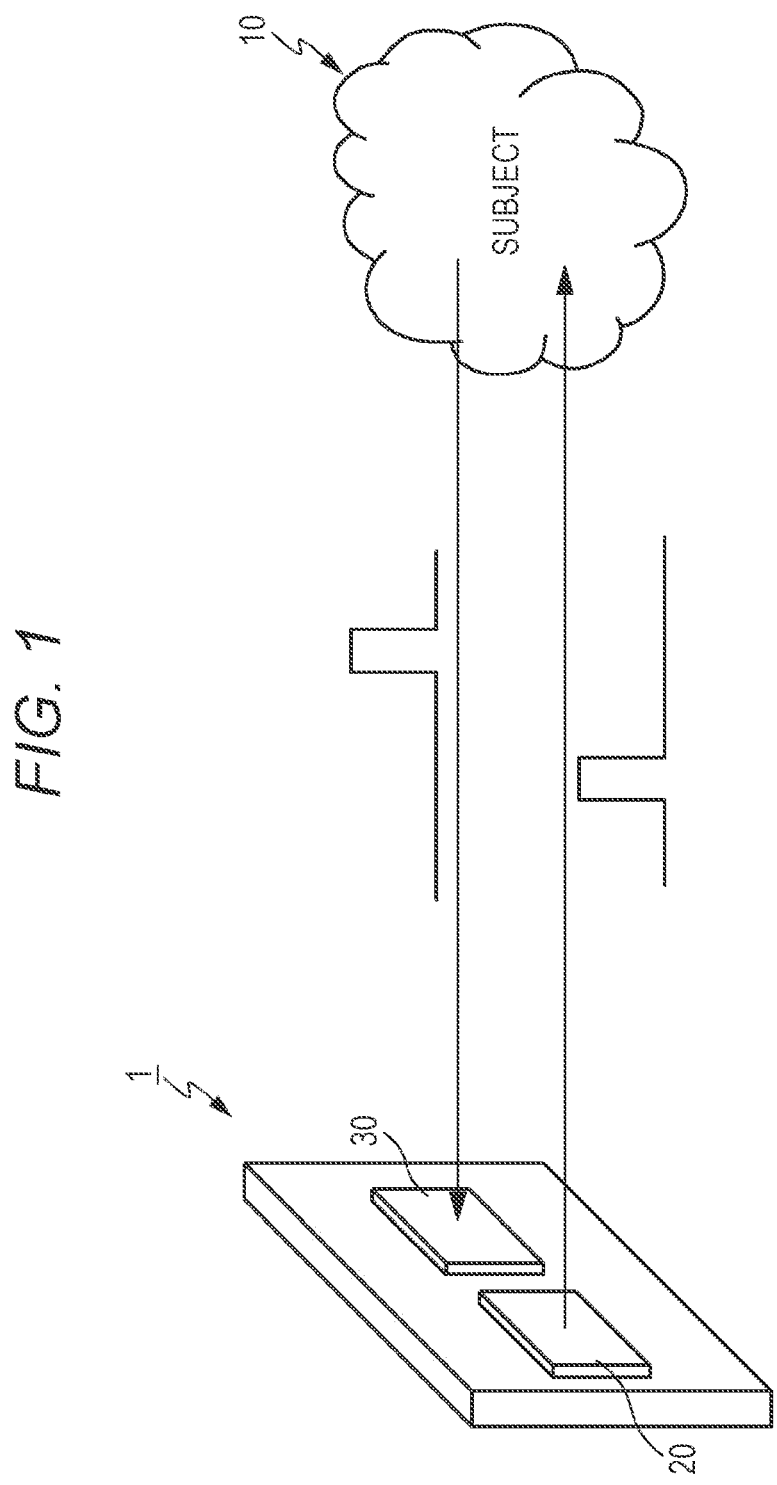

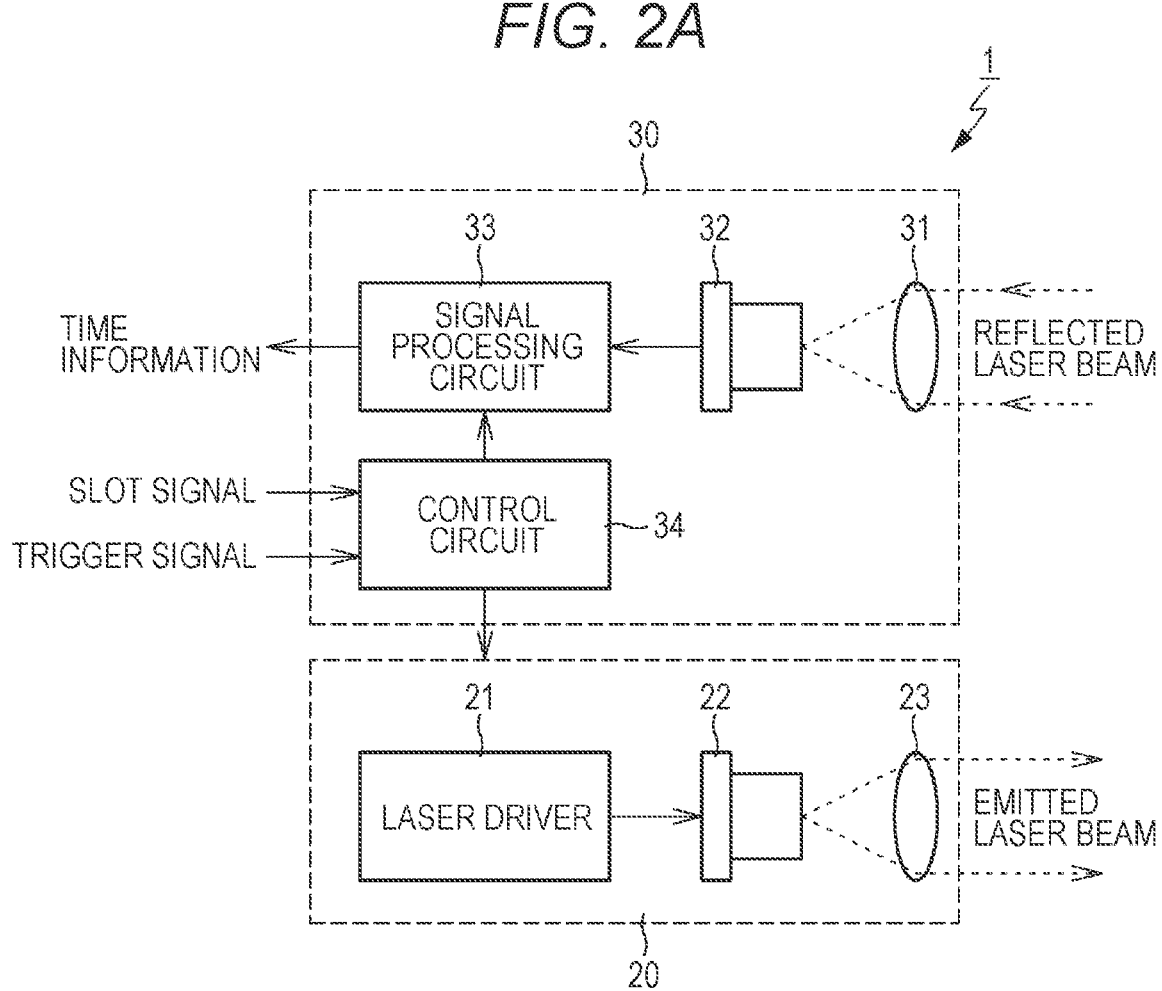
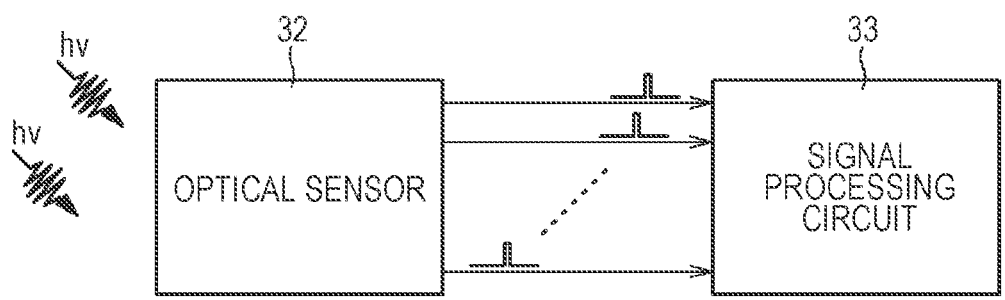

PHOTODETECTOR, DRIVING METHOD OF PHOTODETECTOR, AND DISTANCE MEASURING DEVICE

CROSS REFERENCE TO RELATED APPLICATIONS

This application is a U.S. National Phase of International Patent Application No. PCT/JP2020/000990 filed on Jan. 15, 2020, which claims priority benefit of Japanese Patent Application No. JP 2019-011006 filed in the Japan Patent Office on Jan. 25, 2019. Each of the above-referenced applications is hereby incorporated herein by reference in its entirety.

TECHNICAL FIELD

The present disclosure relates to a photodetector, a driving method of a photodetector, and a distance measuring device (distance measuring instrument).

BACKGROUND ART

There is a photodetector that uses an element that generates a signal in response to reception of a photon as a light receiving element (see Patent Document 1, for example). This type of photodetector adopts, as a measurement method for measuring the distance to an object to be measured, a time of flight (ToF) method in which the time until light emitted toward an object to be measured is reflected by the object to be measured and returns is measured.

CITATION LIST

Patent Document

Patent Document 1: Japanese Patent Application Laid-Open No. 2016-211881

SUMMARY OF THE INVENTION

Problems to be Solved by the Invention

In a photodetector that uses, among the ToF methods, the direct ToF method in which the distance is measured directly from the flight time difference of light, it is necessary to acquire light reception data output from the light receiving element by a high-speed time measuring unit (time-to-digital converter: TDC). However, in a case where light reception data output from one light receiving element is sampled in parallel with multiple clock phases, the peak power is large because the photodetector operates at high speed during sampling. A large peak power has a great influence on the power supply design and the timing design when designing the photodetector.

Against this background, an object of the present disclosure is to provide a photodetector capable of reducing peak power during a sampling operation, a driving method of a photodetector, and a distance measuring device using the photodetector.

Solutions to Problems

A photodetector of the present disclosure for achieving the above object includes
multiple pixels including a light receiving element, and
a sampling circuit that is provided corresponding to the multiple pixels, and samples light reception data output from the pixel on the basis of multiple clock signals having different phases, in synchronization with input of a trigger signal.

The sampling circuit performs a sampling operation on the basis of a clock signal having a different phase every time a trigger signal is input.

Additionally, a driving method of a photodetector of the present disclosure for achieving the above object includes the step of
when driving a photodetector that includes multiple pixels including a light receiving element, and a sampling circuit that is provided corresponding to the multiple pixels, and samples light reception data output from the pixel on the basis of multiple clock signals having different phases, in synchronization with input of a trigger signal,
performing a sampling operation in a sampling circuit on the basis of a clock signal having a different phase every time a trigger signal is input.

Moreover, a distance measuring device (distance measuring instrument) of the present disclosure for achieving the above object includes
a light source that irradiates an object to be measured with light, and
a photodetector that detects light reflected by the object to be measured.
As the photodetector, a photodetector having the above configuration is used.

BRIEF DESCRIPTION OF DRAWINGS

FIG. 1 is a schematic configuration diagram showing a distance measuring device according to an embodiment of the present disclosure.

FIGS. 2A and 2B are block diagrams showing a specific configuration of the distance measuring device.

FIG. 5A shows the timing relationship among a slot signal, a trigger signal, and the sampling timing, and FIG. 5B shows the timing relationship between the trigger signal and two clock signals #0 and #1.

MODE FOR CARRYING OUT THE INVENTION

Figure 3:
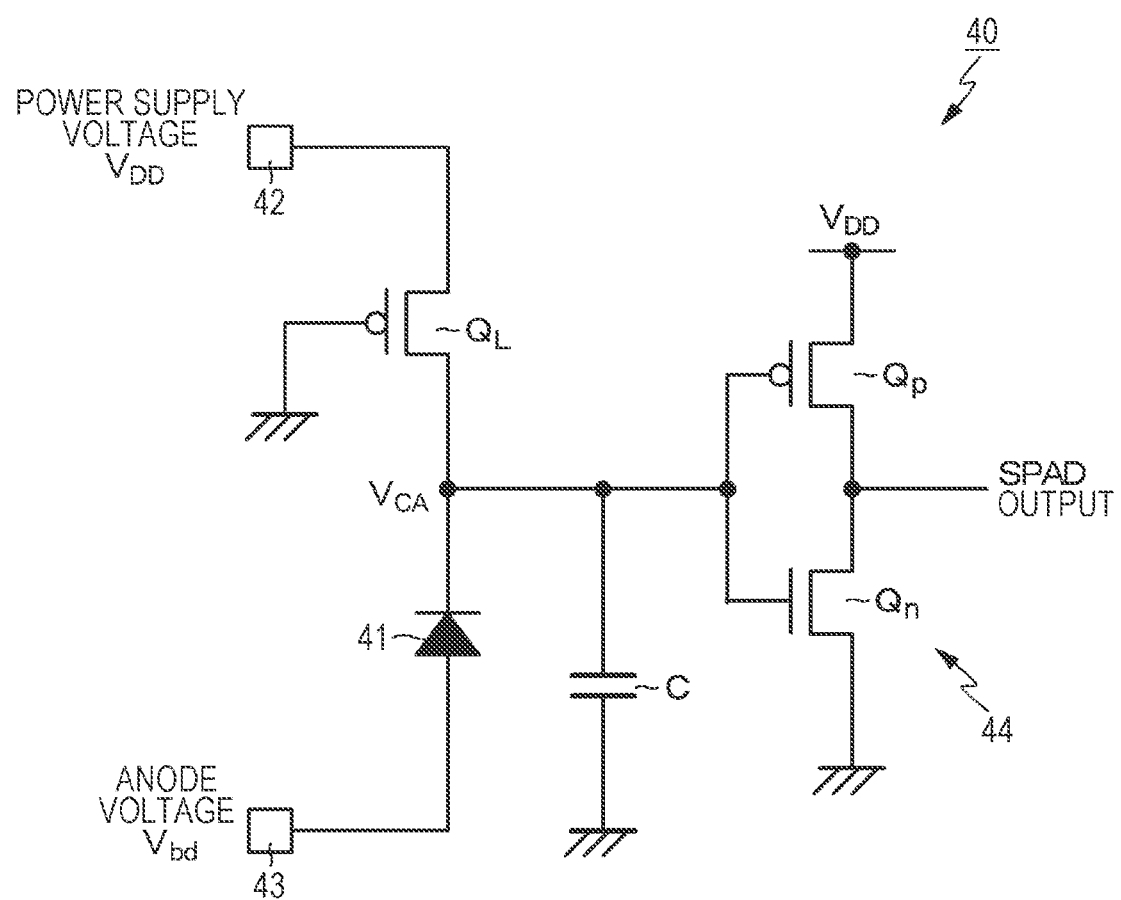
FIG. 3 is a circuit diagram showing an example of the configuration of a pixel circuit in a photodetector using a SPAD sensor.

Hereinafter, a mode for carrying out the technology according to the present disclosure (hereinafter referred to as "embodiment") will be described in detail with reference to the drawings. The technology according to the present disclosure is not limited to the embodiment. In the following description, the same elements or elements having the same function will be denoted by the same reference signs, and redundant description will be omitted. Note that the description will be given in the following order.

1. General description of photodetector and distance measuring device of present disclosure
2. Distance measuring device according to embodiment
2-1. Basic configuration of distance measuring device
2-2. Configuration example of pixel circuit using SPAD sensor
2-3. Basic configuration example of photodetector
3. Photodetector according to embodiment
3-1. Example 1 (Example in which circuit portions for two clock phases are mounted as first signal processing unit)
3-2. Example 2 (Example in which circuit portion for only one clock phase is mounted as first signal processing unit)
3-3. Example 3 (Modification of Example 2: Example in which one circuit portion of first signal processing unit is divided according to clock phase, and clock phase is changed for each SPAD region)
3-4. Example 4 (Example of driving method of photodetector according to Example 4)
4. Application example of technology according to present disclosure (Example of mobile unit)
5. Conceivable configuration of present disclosure <General Description of Photodetector and Distance Measuring Device of Present Disclosure>

In a photodetector and a distance measuring device of the present disclosure, the sampling circuit may have a latch circuit that performs a sampling operation of light reception data on the basis of a clock signal having a different phase every time a trigger signal is input.

Moreover, in the photodetector and the distance measuring device of the present disclosure including the above-described preferable configuration, the sampling circuit may have multiple latch circuits provided corresponding to the phases of the multiple clock signals. Then, the multiple latch circuits may perform a sampling operation of light reception data in turns, every time a trigger signal is input.

Alternatively, in the photodetector and the distance measuring device of the present disclosure including the above-described preferable configuration, the sampling circuit may have a single latch circuit commonly provided for the phases of the multiple clock signals, and the single latch circuit may perform a sampling operation of light reception data in turns for each phase of the multiple clock signals. Additionally, the sampling circuit may have a selector circuit that selects from the multiple clock signals for each phase and supplies the clock signal to the single latch circuit.

Alternatively, in the photodetector and the distance measuring device of the present disclosure including the above-described preferable configuration, the sampling circuit may have a single latch circuit commonly provided for the phases of the multiple clock signals, and the single latch circuit may perform a sampling operation of light reception data in turns for each phase of the multiple clock signals by using the light reception data of multiple pixels as a unit. Additionally, the sampling circuit may have a selector circuit that selects from the multiple clock signals for each phase and supplies the clock signal to the single latch circuit by using the light reception data of multiple pixels as a unit.

Moreover, in the photodetector and the distance measuring device of the present disclosure including the above-mentioned preferable configuration, the light receiving element may include an element that generates a signal in response to reception of a photon. Then, the light receiving element may include a single photon avalanche diode.

<Distance Measuring Device According to Embodiment>

First, the basic configuration of the distance measuring device to which the technology according to the present disclosure is applied (i.e., distance measuring device according to implementation process of present disclosure) will be described with reference to FIG. 1.

[Basic Configuration of Distance Measuring Device]

FIG. 1 is a schematic configuration diagram showing the distance measuring device according to the embodiment of the present disclosure. A distance measuring device 1 according to the present embodiment adopts, as a measuring method for measuring the distance to a subject 10 which is the object to be measured, a time of flight (ToF) method in which the time until light (e.g., laser beam having peak wavelength in infrared wavelength region) emitted toward the subject 10 is reflected by the subject 10 and returns is measured. In order to achieve distance measurement by the ToF method, the distance measuring device 1 according to the present embodiment includes a light source 20 and a photodetector 30. Then, as the photodetector 30, a photodetector according to the embodiment of the present disclosure described later is used.

The basic configuration of the distance measuring device 1 is shown in FIGS. 2A and 2B. The light source 20 has, for example, a laser driver 21, a laser light source 22, and a diffusing lens 23, and irradiates the subject 10 with a laser beam. The laser driver 21 drives the laser light source 22 under the control of a control circuit 34 of the photodetector 30. The laser light source 22 includes a semiconductor laser, for example, and emits a laser beam when driven by the laser driver 21. The diffusing lens 23 diffuses the laser beam emitted from the laser light source 22 and irradiates the subject 10 with the laser beam.

The photodetector 30 has a light receiving lens 31, an optical sensor 32 which is a light receiving unit, a signal processing circuit 33, and the control circuit 34. The photodetector 30 receives laser beam that is emitted by the laser irradiation unit 20 and returns after being reflected by the subject 10. The light receiving lens 31 collects the reflected laser beam from the subject 10 on the light receiving surface of the optical sensor 32. The optical sensor 32 receives the reflected laser beam from the subject 10 that has passed through the light receiving lens 31 in pixel units and performs photoelectric conversion. Details of the optical sensor 32 will be described later.

The output signal of the optical sensor 32, that is, the light reception data output from the pixels is supplied to the signal processing circuit 33. Under the control of the control circuit 34, the signal processing circuit 33 measures a time t until the laser beam emitted from the light source 20 toward the subject 10 is reflected by the subject 10 and returned to the photodetector 30, and outputs the time t as time information detected by the photodetector 30. The distance to the subject 10 can be obtained on the basis of the time information (time t) detected by the photodetector 30.

An example of a time measurement method is a method in which a timer is started at the emission timing of pulsed light from the light source 20 and the timer is stopped at the reception timing of the pulsed light by the photodetector 30, to measure the time t. An example of another time measurement method is a method in which pulsed light is emitted from the light source 20 at a predetermined cycle, the cycle at which the photodetector 30 receives the pulsed light is detected, and the time t is measured from the phase difference between the light emission cycle and the light reception cycle. The time measurement is performed multiple times, and the time t can be measured by detecting the peak of a histogram obtained by accumulating the times measured multiple times.

The control circuit 34 includes, for example, a central processing unit (CPU) or the like, and controls the light source 20 and the signal processing circuit 33 on the basis of a slot signal and a trigger signal given from the outside of the photodetector 30.

As the optical sensor 32, a two-dimensional array sensor (so-called area sensor) in which pixels including light receiving elements are two-dimensionally arranged in a matrix (array shape) can be used, or a one-dimensional array sensor (so-called line sensor) in which pixels including light receiving elements are arranged in a linear shape can be used.

As the optical sensor 32, a sensor can be used in which the light receiving element of the pixel includes an element that generates a signal in response to reception of a photon, such as a single photon avalanche diode (SPAD) sensor. That is, in the photodetector 30 according to this example, the light receiving element of the pixel includes a SPAD sensor. Note that the light receiving element is not limited to the SPAD sensor, and may be various elements such as an avalanche photo diode (APD) and a current assisted photonic demodulator (CAPD).

[Configuration Example of Pixel Circuit Using SPAD Sensor]

FIG. 3 shows an example of the configuration of a pixel circuit in the photodetector 30 using the SPAD sensor. Here, the basic configuration for one pixel is shown.

In the pixel circuit of a pixel 40 according to this example, the cathode electrode of a SPAD sensor 41 is connected to a terminal 42 to which a power supply voltage $V_{DD}$ is given, through a P-type MOS transistor $Q_L$ which is a load, and the anode electrode of the SPAD sensor 41 is connected to a terminal 43 to which an anode voltage $V_{bd}$ is given. As the anode voltage $V_{bd}$, a large negative voltage that causes avalanche multiplication is applied.

A capacitive element C is connected between the anode electrode and the ground. Then, a cathode voltage $V_{CA}$ of the SPAD sensor 41 is derived as a SPAD output (pixel output) through a CMOS inverter 54 in which a P-type MOS transistor $Q_p$ and an N-type MOS transistor $Q_n$ are connected in series.

A voltage equal to or higher than a breakdown voltage $V_{BD}$ is applied to the SPAD sensor 41. The excess voltage equal to or higher than the breakdown voltage $V_{BD}$ is called an excess bias voltage $V_{EX}$, and is generally a voltage of about 2-5 V. The SPAD sensor 41 operates in a region called Geiger mode where there is no DC stable point.

[Basic Configuration Example of Photodetector]

Figure 4:
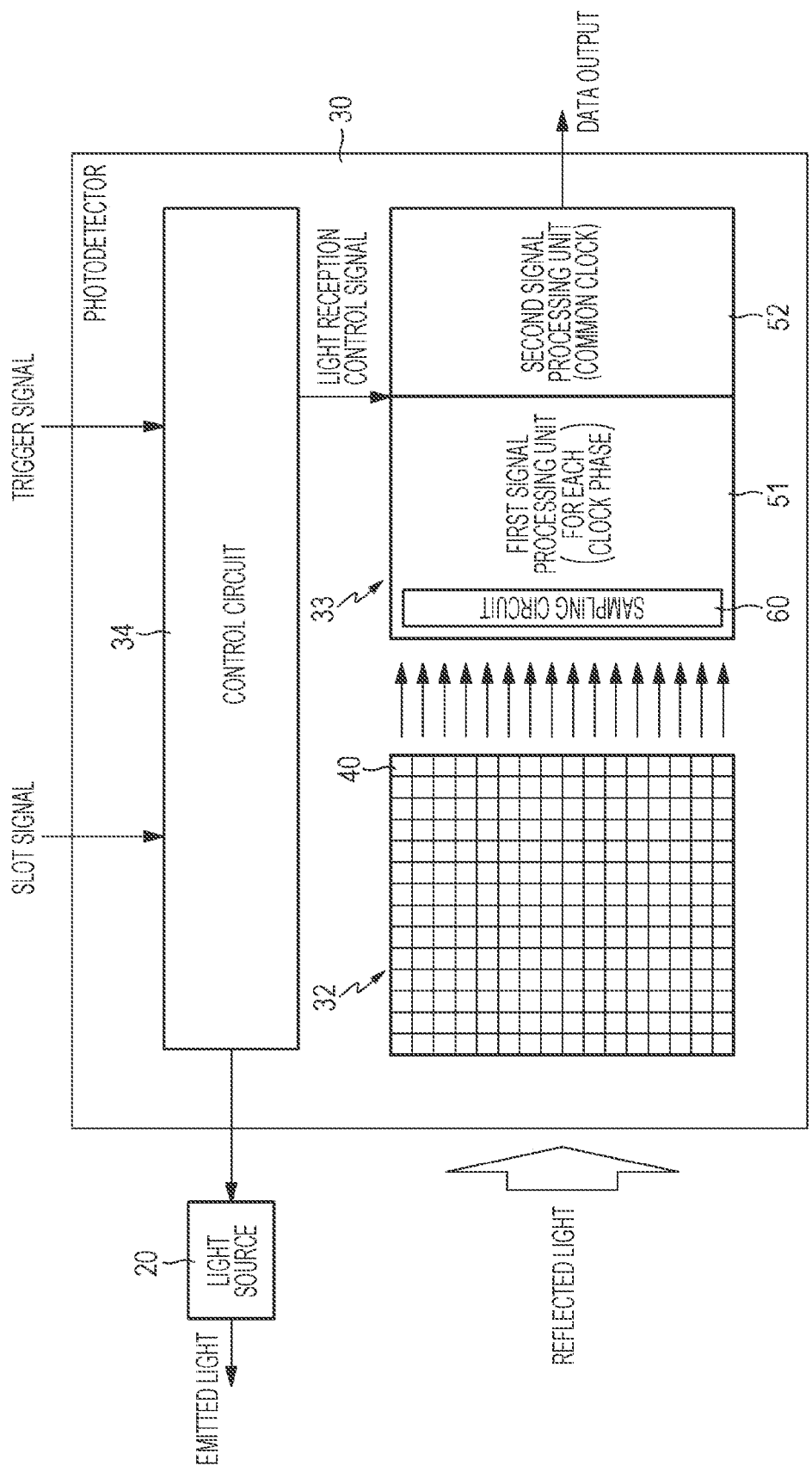
FIG. 4 is a block diagram showing an example of a basic configuration of the photodetector according to the embodiment of the present disclosure.

FIG. 4 shows an example of the basic configuration of the photodetector 30. The photodetector 30 according to this configuration example uses, as the optical sensor 32, a two-dimensional array sensor in which multiple pixels 40 including a light receiving element (e.g., SPAD sensor) are two-dimensionally arranged in a matrix (array). Each piece of light reception data of the multiple pixels 40 is supplied to the signal processing circuit 33.

The control circuit 34 controls the signal processing circuit 33 on the basis of the slot signal and the trigger signal given from the outside of the photodetector 30. The signal processing circuit 33 is provided corresponding to multiple pixels 40, and is provided for each of the multiple pixels 40, for example. The signal processing circuit 33 includes a first signal processing unit 51 in the first stage and a second signal processing unit 52 in the latter stage, and, under the control of the control circuit 34, performs signal processing for distance measurement on each piece of light reception data output from the multiple pixels 40.

Specifically, the first signal processing unit 51 in the first stage uses the direct ToF method of calculating the distance directly from the flight time difference of light, to perform signal processing for distance measurement on the basis of light reception data output from the pixel 40. That is, the first signal processing unit 51 is a time measurement circuit (TDC circuit) that measures the time t until light emitted toward an object to be measured is reflected by the object to be measured and returns. The time measurement by the first signal processing unit 51 is performed multiple times, and the time t is measured by detecting the peak of the histogram obtained by accumulating the times measured multiple times.

The second signal processing unit 52 in the latter stage has a memory (e.g., SRAM), stores data for each pixel 40 output from the first signal processing unit 51, and outputs the data stored in the memory on the basis of a clock signal common to all pixels.

The first signal processing unit 51 has, in its input stage, a sampling circuit 60 that samples the light reception data output from the pixel 40 on the basis of multiple clock signals having different phases.

Here, the operation of the sampling circuit 60 in a case where two clock signals, a clock signal #0 having a phase of 0 degrees and a clock signal #1 having a phase of 180 degrees, are used as multiple clock signals having different phases will be described with reference to FIGS. 5A and 5B.

Figure 5A:
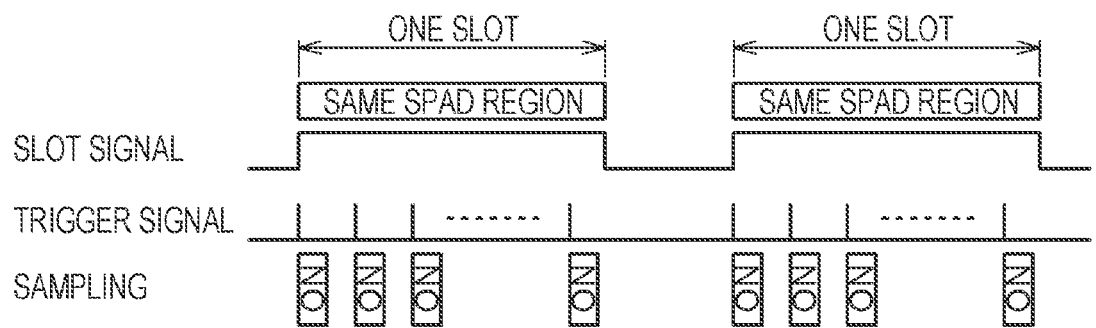
FIGS. 5A and 5B are explanatory diagrams of the basic operation of a sampling circuit, where

As shown in FIG. 5A, the slot signal input to the control circuit 34 is a signal that becomes active (e.g., high level) by regarding the same SPAD region as one slot. The trigger signal is input to the control circuit 34 multiple times during the active period of the slot signal, that is, during one slot period.

Figure 5B:
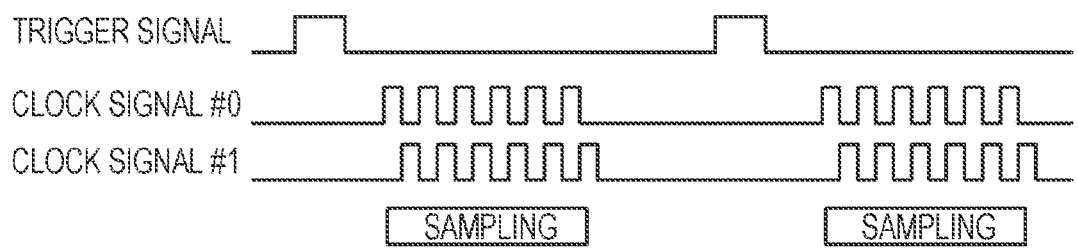

Every time a trigger signal is input to the control circuit 34, the sampling circuit 60 samples light reception data output from the pixel 40 in synchronization with the two clock signals #0 and #1 having different phases as shown in FIG. 5B. That is, the sampling circuit 60 samples the light reception data output from the pixel 40 in parallel with multiple clock phases. Then, the first signal processing unit 51 stores the sampling data in the sampling circuit 60 for one slot period, and outputs the sampling data stored during the one slot period to the second signal processing unit 52 in the latter stage.

In a case where light reception data output from one SPAD sensor 41 (pixel 40) is sampled in parallel with multiple clock phases as described above, the TDC circuit (i.e., first signal processing unit 51) including the sampling circuit 60 of the clock signals #0 and #1 operates at high speed during sampling. Hence, the IR drop is very large and the peak power is large. A large peak power has a great influence on the power supply design and the timing design when designing the photodetector 30.

<Photodetector According to Embodiment>

In the present embodiment, in the sampling circuit 60 that is provided corresponding to multiple pixels 40 and samples light reception data output from the pixel 40 on the basis of multiple clock signals having different phases, every time a trigger signal is input, a sampling operation is performed on the basis of a clock signal having a different phase, in other words, a sampling operation is performed by switching the phase of the clock signal to be sampled.

By switching the phase of the clock signal to be sampled every time a trigger signal is input, in the sampling circuit 60, less circuit portions are activated during the sampling operation as compared to the case where sampling is performed in parallel with multiple clock signals having different phases. Accordingly, the peak power during the sampling operation can be reduced. Additionally, depending on the circuit configuration of the sampling circuit 60 (cases of Example 2 and Example 3 described later), the circuit scale can be reduced as well.

Hereinafter, a specific example of the present embodiment for performing a sampling operation on the basis of a clock signal having a different phase every time a trigger signal is input in the sampling circuit 60 will be described.

Example 1

Figure 6:
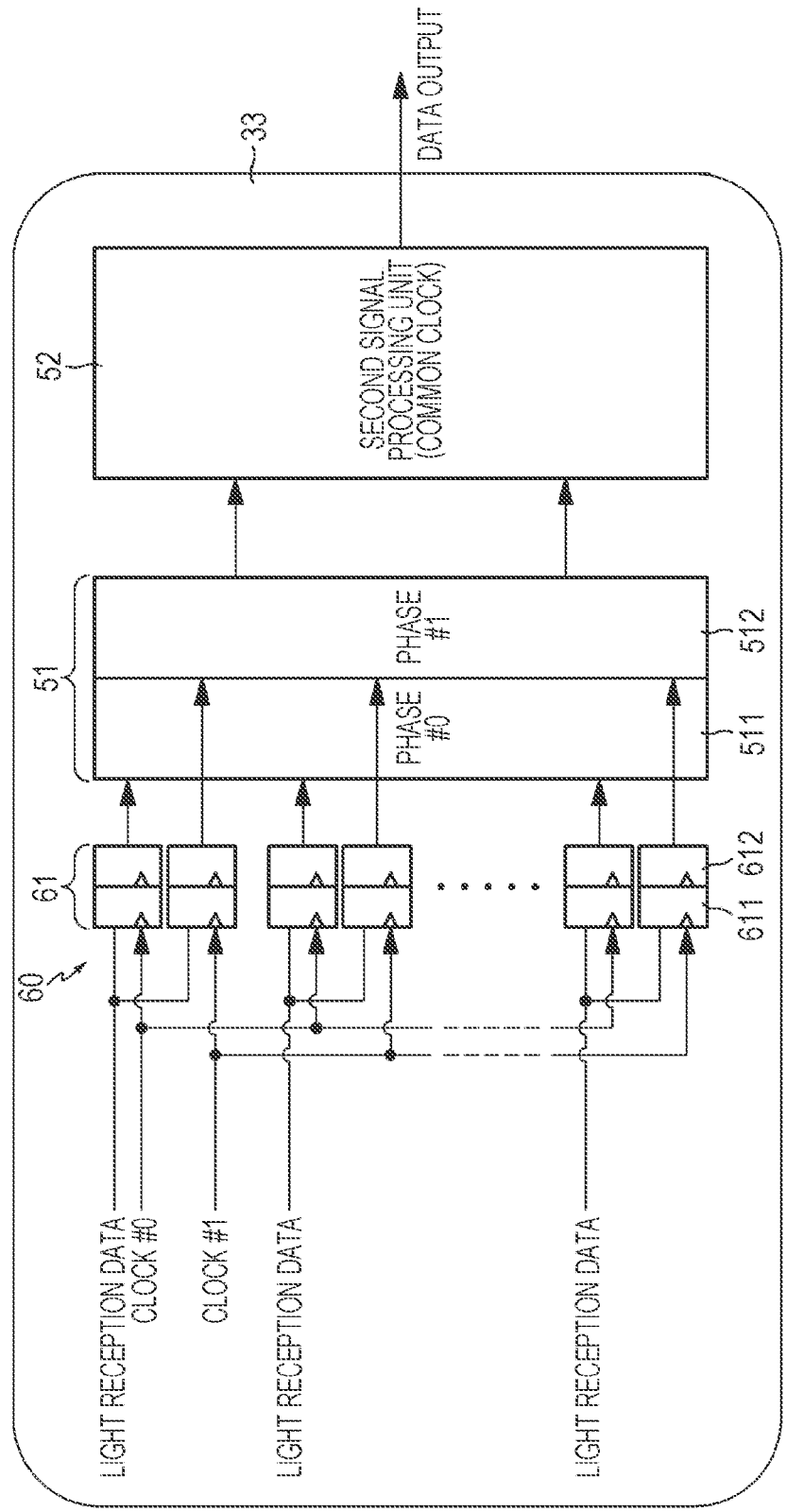
FIG. 6 is a block diagram showing a circuit configuration of a signal processing circuit in a photodetector according to Example 1.

Example 1 is an example in which circuit portions for two clock phases are mounted as a first signal processing unit 51. FIG. 6 shows a block diagram of the circuit configuration of a signal processing circuit 33 in a photodetector 30 according to Example 1. Here, of the signal processing circuit 33 provided corresponding to each of the pixels 40, the circuit configuration of only one pixel is shown. This point is the same for the examples described later.

The photodetector 30 according to Example 1 has, as the first signal processing unit 51, circuit portions 511 and 512 for two clock phases, and has, as a sampling circuit 60 in the input stage, a latch circuit 61 for each of two clock signals #0 and #1 with different phases. The latch circuit 61 includes two cascade-connected flip-flops 611 and 612, and two latch circuits 61 are arranged for the light reception data output from one SPAD sensor 41 (pixel 40).

Then, one of the two latch circuits 61 samples and latches light reception data on the basis of the clock signal #0, and supplies the latched data to one circuit portion 511 of the first signal processing unit 51. The other of the two latch circuits 61 latches light reception data on the basis of the clock signal #1, and supplies the latched data to the other circuit portion 512 of the first signal processing unit 51. That is, one clock signal phase is sampled for one input of the trigger signal.

The circuit operation of the first signal processing unit 51 in the photodetector 30 according to Example 1 of the above configuration will be described with reference to FIG. 7.

In the sampling circuit 60, the two latch circuits 61 provided for each of the two clock signals #0 and #1 having different phases perform a sampling operation of light reception data in turns for each phase of the two clock signals #0 and #1, every time a trigger signal is input to the control circuit 34. Specifically, every time a trigger signal is input, one of the two latch circuits 61 latches the light reception data on the basis of the clock signal #0 having a phase of 0 degrees, and then the other of the two latch circuits 61 latches the light reception data on the basis of the clock signal #1 having a phase of 180 degrees. That is, at the input of the first trigger signal, the sampling operation is performed only by the clock signal #0, and at the input of the next trigger signal, the sampling operation is performed only by the clock signal #1.

Figure 7:
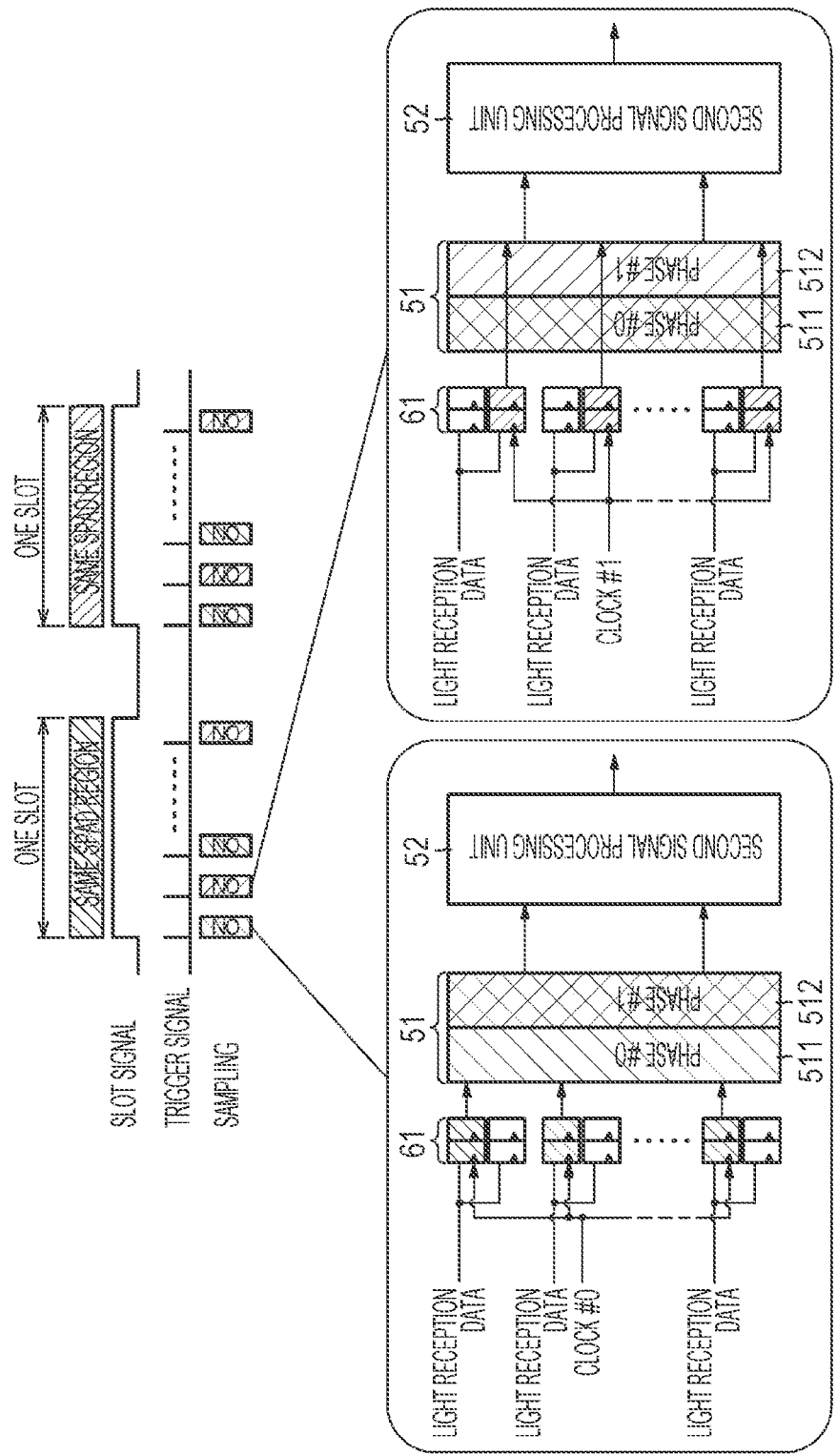
FIG. 7 is a block diagram for describing the circuit operation of a first signal processing unit in the photodetector according to Example 1.

In FIG. 7, the left diagram shows the case where the sampling operation of light reception data is performed on the basis of the clock signal #0 having a phase of 0 degrees, and the right diagram shows the case where the sampling operation of light reception data is performed on the basis of the clock signal #1 having a phase of 180 degrees.

As described above, in the first signal processing unit 51 of the photodetector 30 according to Example 1, two latch circuits 61 provided for each of two clock signals #0 and #1 having different phases alternately (in turns) perform a sampling operation, every time a trigger signal is input. For this reason, during the sampling operation, in the first signal processing unit 51, one of the shaded circuit portions 512 and 511 does not operate, and only the other of the shaded circuit portions 511 and 512 operates. That is, since the circuit portions activated during the sampling operation is halved compared to the case where sampling is performed in parallel with the two clock signals #0 and #1, the peak power during the sampling operation can be reduced to about ½.

Note that in Example 1, two clock signals, the clock signal #0 having a phase of 0 degrees and the clock signal #1 having a phase of 180 degrees, are exemplified as multiple clock signals having different phases. However, the invention is not limited to the two-phase clock, and may use a multi-phase clock having three or more phases. The larger the number of phases, the greater the effect of reducing the peak power during the sampling operation. This point is the same for Example 2 and Example 3 described later.

Example 2

Figure 8:
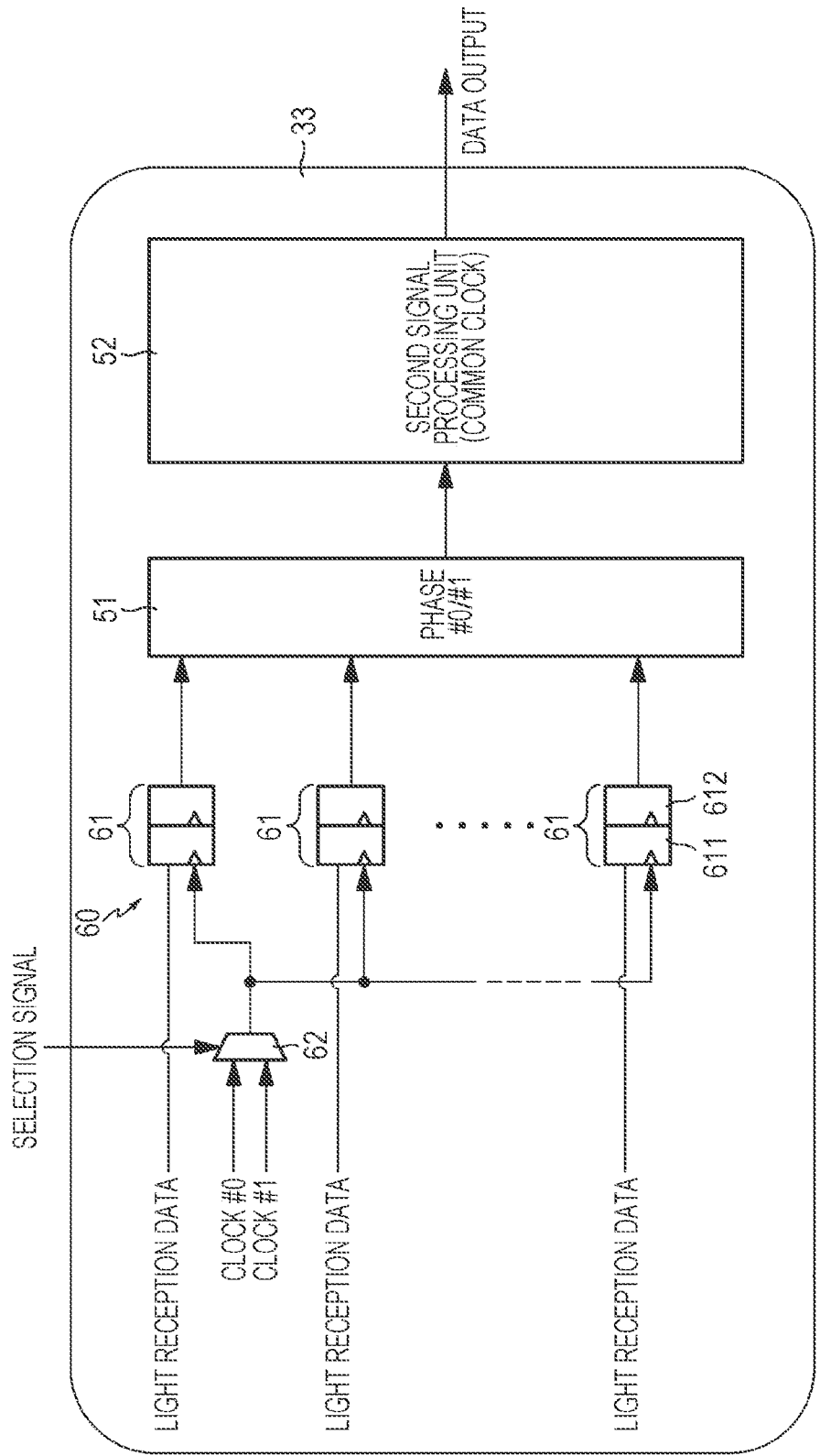
FIG. 8 is a block diagram showing a circuit configuration of a signal processing circuit in a photodetector according to Example 2.

Example 2 is an example in which a circuit portion for only one clock phase is mounted as a first signal processing unit 51. FIG. 8 shows a block diagram of the circuit configuration of a signal processing circuit 33 in a photodetector 30 according to Example 2.

The photodetector 30 according to Example 2 has the first signal processing unit 51 including a circuit portion common to two clock signals #0 and #1 having different phases, and has, as a sampling circuit 60 in the input stage, a single latch circuit 61 commonly provided for the two clock signals #0 and #1. The latch circuit 61 includes two cascade-connected flip-flops 611 and 612, and one latch circuit 61 is arranged for the light reception data output from one SPAD sensor 41 (pixel 40).

Then, in a stage preceding the clock input to the latch circuit 61, a selector circuit 62 is provided to select from the two clock signals #0 and #1 for each phase and use the clock signal #0 or #1 as the clock input of the single latch circuit 61. On the basis of a selection signal synchronized with a trigger signal and supplied from the outside of the photodetector 30, the selector circuit 62 selects the clock signal #0 having a phase of 0 degrees when the selection signal is logic "1", and selects the clock signal #0 having a phase of 180 degrees when the selection signal is logic "0", for example.

The circuit operation of the first signal processing unit 51 in the photodetector 30 according to Example 2 of the above configuration will be described with reference to FIG. 9.

In the sampling circuit 60, the latch circuit 61 commonly provided for the two clock signals #0 and #1 performs a sampling operation of light reception data output from the pixel 40 in turns for each phase of the clock signal #0 or #1 selected by the selector circuit 62, every time a trigger signal is input.

Figure 9:
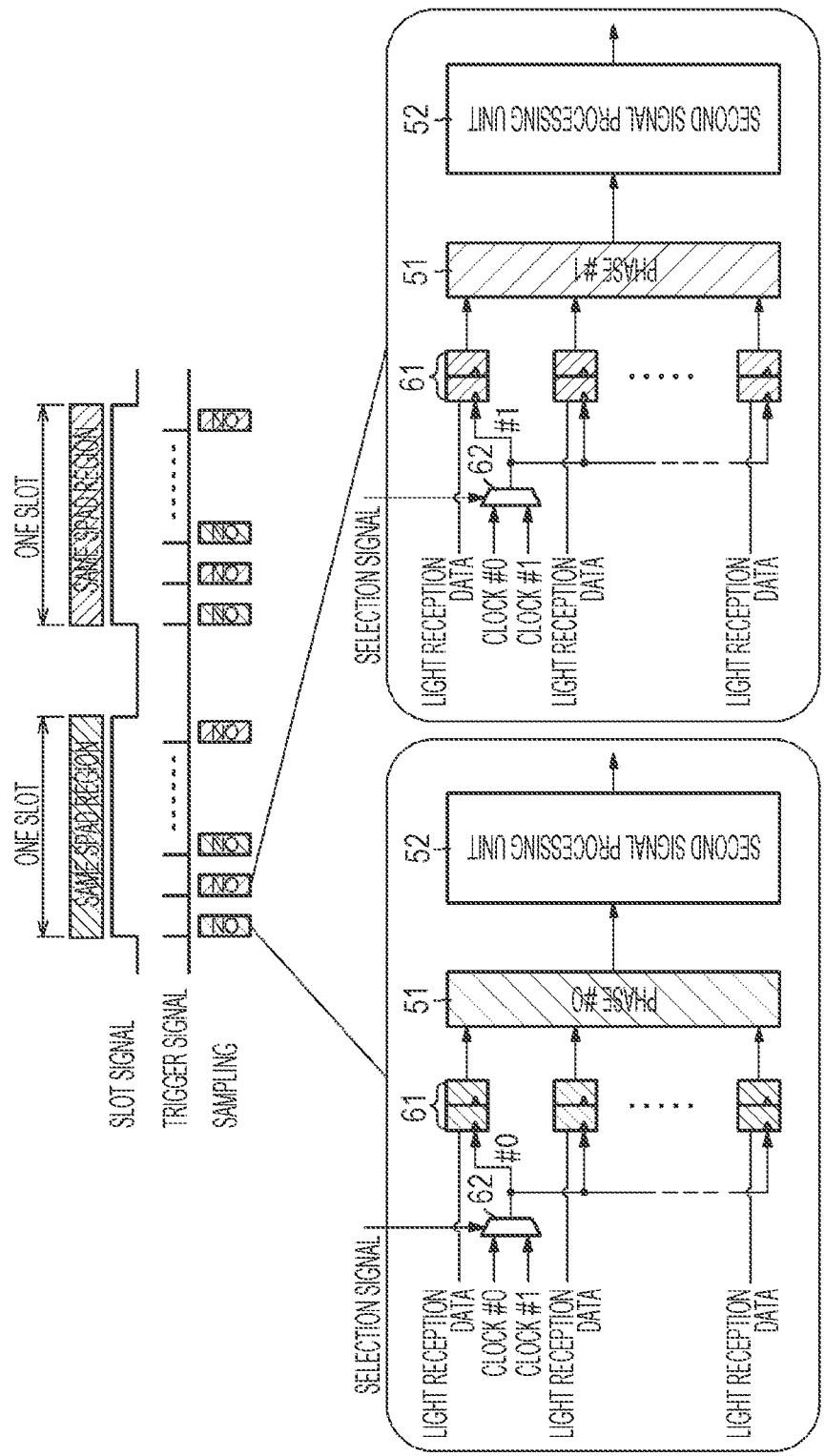
FIG. 9 is a block diagram for describing the circuit operation of a first signal processing unit in the photodetector according to Example 2.

In FIG. 9, the left diagram shows the case where the sampling operation of light reception data is performed on the basis of the clock signal #0 having a phase of 0 degrees, and the right diagram shows the case where the sampling operation of light reception data is performed on the basis of the clock signal #1 having a phase of 180 degrees.

As described above, in the photodetector 30 according to Example 2, since the first signal processing unit 51 including the sampling circuit 60 includes the circuit portion for one clock phase, in the case of using clock signals #0 and #1 of two phases, the circuit scale can be reduced by half. FIG. 8 illustrates the circuit configuration of the signal processing circuit 33 corresponding to one pixel. However, since the signal processing circuit 33 is provided corresponding to each of the pixels 40, the circuit scale reduction effect of Example 2 is great. Moreover, in the first signal processing unit 51 including the sampling circuit 60, less circuit portions are activated during the sampling operation as compared to the case where sampling is performed in parallel with the two clock signals #0 and #1. Hence, the peak power during the sampling operation can be reduced to about ½.

Example 3

Figure 10:
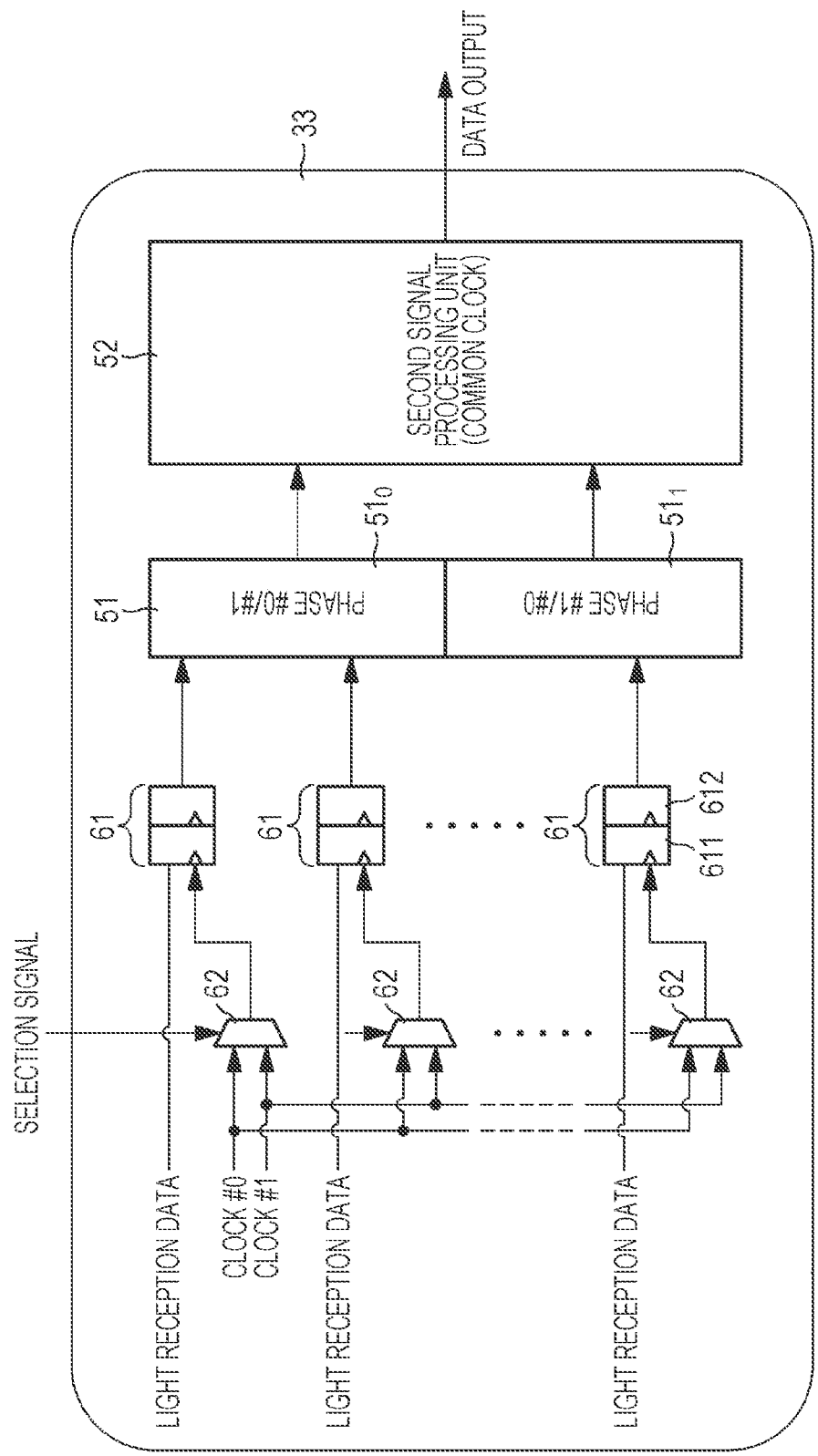
FIG. 10 is a block diagram showing a circuit configuration of a signal processing circuit in a photodetector according to Example 3.

Example 3 is a modification of Example 2, and is an example in which one circuit portion of a first signal processing unit 51 is divided according to the clock phase, and the clock phase is changed for each SPAD region. FIG. 10 shows a block diagram of the circuit configuration of a signal processing circuit 33 in a photodetector 30 according to Example 2.

In the photodetector 30 according to Example 3, one circuit portion of the first signal processing unit 51 in the case of Example 2 is divided into multiple circuit portions (two circuit portions 510 and 511 in this example) corresponding to two clock signals #0 and #1, and the circuit portions 510 and 511 are used appropriately for each SPAD region using the light reception data of multiple pixels 40 (i.e., multiple SPAD sensors 41) as a unit.

Specifically, a selector circuit 62 selects from the two clock signals #0 and #1 for each phase on the basis of the selection signal synchronized with a trigger signal, and uses the clock signal #0 or #1 as the clock input of a single latch circuit 61 for each SPAD region using the light reception data of multiple pixels 40 as a unit. As a result, one of the circuit portions 510 and 511 is used for a certain SPAD region, and the other of the circuit portions 510 and 511 is used for another SPAD region. Then, the sampling operation of light reception data is performed in turns for each phase of the two clock signals #0 and #1 with the light reception data of multiple pixels 40 as a unit.

The circuit operation of the first signal processing unit 51 in the photodetector 30 according to Example 3 of the above configuration will be described with reference to FIG. 11.

In a sampling circuit 60, the latch circuit 61 commonly provided for the two clock signals #0 and #1 performs a sampling operation of light reception data in turns for each phase of the clock signal #0 or #1 selected by the selector circuit 62 in synchronization with the trigger signal, for each SPAD region using the light reception data of multiple pixels 40 as a unit.

Figure 11:
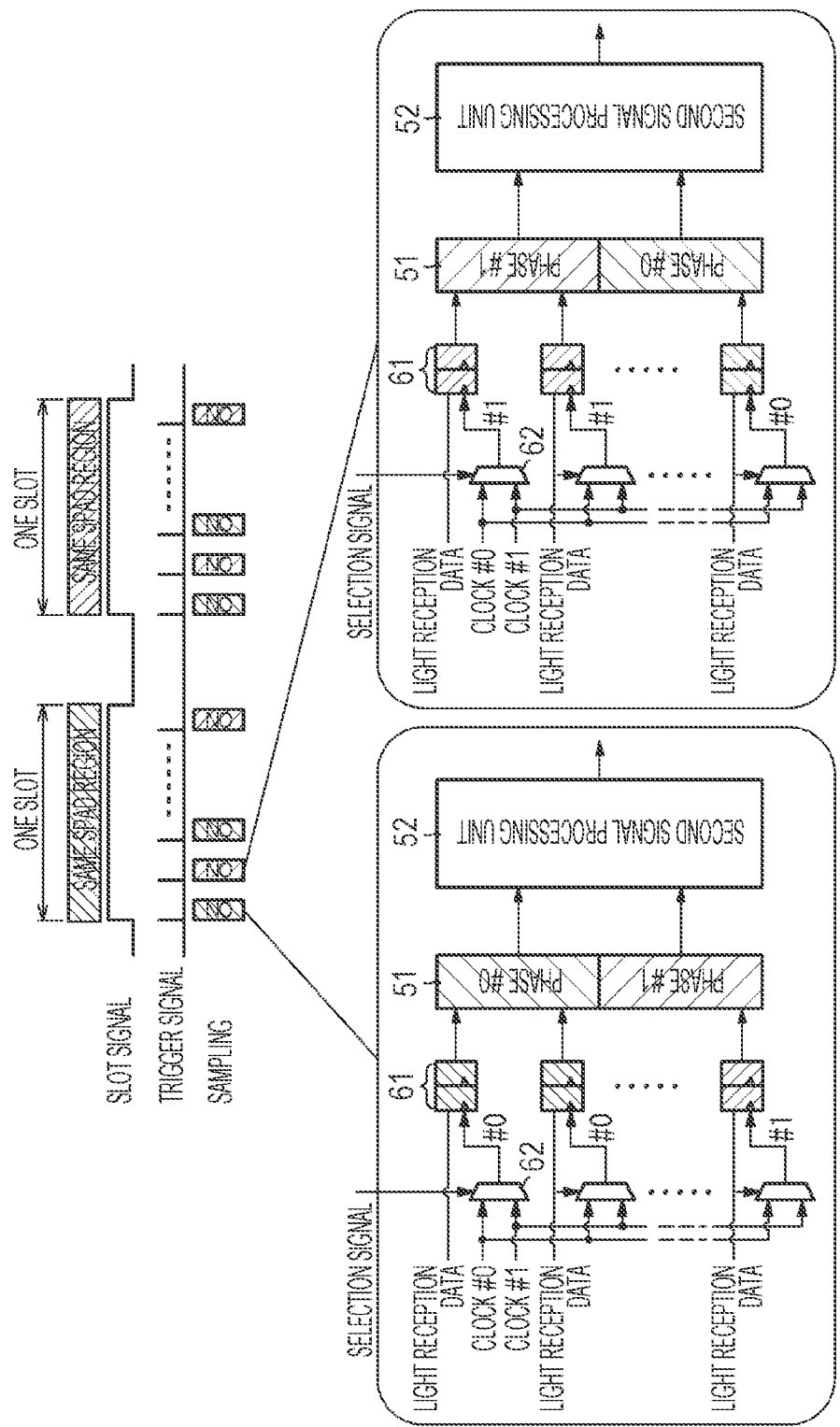
FIG. 11 is a block diagram for describing the circuit operation of a first signal processing unit in the photodetector according to Example 3.

In FIG. 11, the left diagram shows the case where a sampling operation is performed on the basis of the clock signal #0 on the circuit portion 510 side, and a sampling operation is performed on the basis of the clock signal #1 on the circuit portion 511 side. Meanwhile, the right diagram shows the case where a sampling operation is performed on the basis of the clock signal #1 on the circuit portion 510 side, and a sampling operation is performed on the basis of the clock signal #0 on the circuit portion 511 side.

As described above, in the photodetector 30 according to Example 3, the first signal processing unit 51 including the sampling circuit 60 includes the circuit portion for one clock phase. Hence, as in Example 2, in the case of using clock signals #0 and #1 of two phases, the circuit scale can be reduced by half. Moreover, in the first signal processing unit 51 including the sampling circuit 60, less circuit portions are activated during the sampling operation as compared to the case where sampling is performed in parallel with the two clock signals #0 and #1. Hence, the peak power during the sampling operation can be reduced to about ½ (=¼+¼).

Note that while the case where the first signal processing unit 51 is divided into two upper and lower parts (#0 and #1) has been exemplified, the invention is not limited to the division into upper and lower parts. The first signal processing unit 51 may be divided into multiple upper and lower parts including four or more upper and lower parts (#0, #1, #0, and #1) using the light reception data of multiple pixels 40 as a unit.

Example 4

Figure 12:
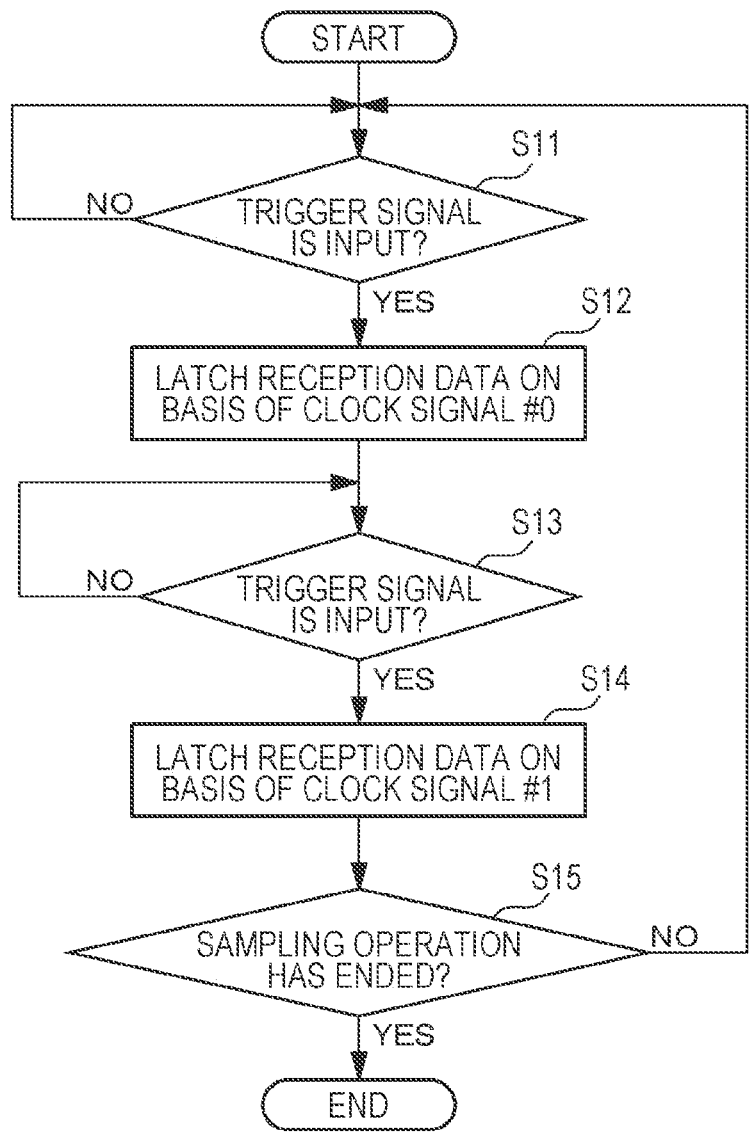
FIG. 12 is a flowchart showing an example of processing of a driving method of a photodetector according to Example 4.

Example 4 is an example of the driving method of the photodetector 30 according to the embodiment of the present disclosure. FIG. 12 shows a flowchart of an example of processing of the driving method of the photodetector 30 according to Example 4.

The processing of the driving method of the photodetector 30 according to Example 4 is performed in the signal processing circuit 33 under the control of the control circuit 34.

The control circuit 34 monitors input of the trigger signal (step S11), and if it determines that the trigger signal has been input (YES in S11), the control circuit 34 latches the light reception data on the basis of the clock signal #0 having a phase of 0 degrees (step S12). The control circuit 34 then monitors input of the trigger signal again (step S13).

If the control circuit 34 determines in the processing of step S13 that the trigger signal has been input (YES in S13), the control circuit 34 latches the light reception data on the basis of the clock signal #1 having a phase of 180 degrees (step S14). Thereafter, the control circuit 34 repeats the processing from step S11 to step S14 until the sampling operation ends.

As described above, in the driving method of the photodetector 30 according to Example 4, every time a trigger signal is input, the two latch circuits 61 provided for each of the two clock signals #0 and #1 having different phases perform a sampling operation alternately (in turns). Consequently, the circuit portions activated during the sampling operation is halved compared to the case where sampling is performed in parallel with the two clock signals #0 and #1. Hence, the peak power during the sampling operation can be reduced to about ½.

<Modification>

While the technology according to the present disclosure has been described above on the basis of the preferred embodiment, the technology according to the present disclosure is not limited to the embodiment. The configuration and structure of the photodetector and distance measuring device described in the above embodiment are examples, and can be changed as appropriate. For example, in the above embodiment, the case where the SPAD sensor is used as the light receiving element has been described as an example. However, the light receiving element is not limited to the SPAD sensor, and a similar action and effect can be obtained even in a case where an element such as APD or CAPD is used.

<Application Example of Technology According to Present Disclosure>

The technology according to this disclosure can be applied to various products. A more specific application example will be described below. For example, the technology according to the present disclosure may be implemented as a distance measuring device mounted on any type of mobile unit including a car, an electric car, a hybrid electric car, a motorcycle, a bicycle, a personal mobility, an airplane, a drone, a ship, a robot, a construction machine, an agricultural machine (tractor), and the like.

[Mobile Unit]

Figure 13:
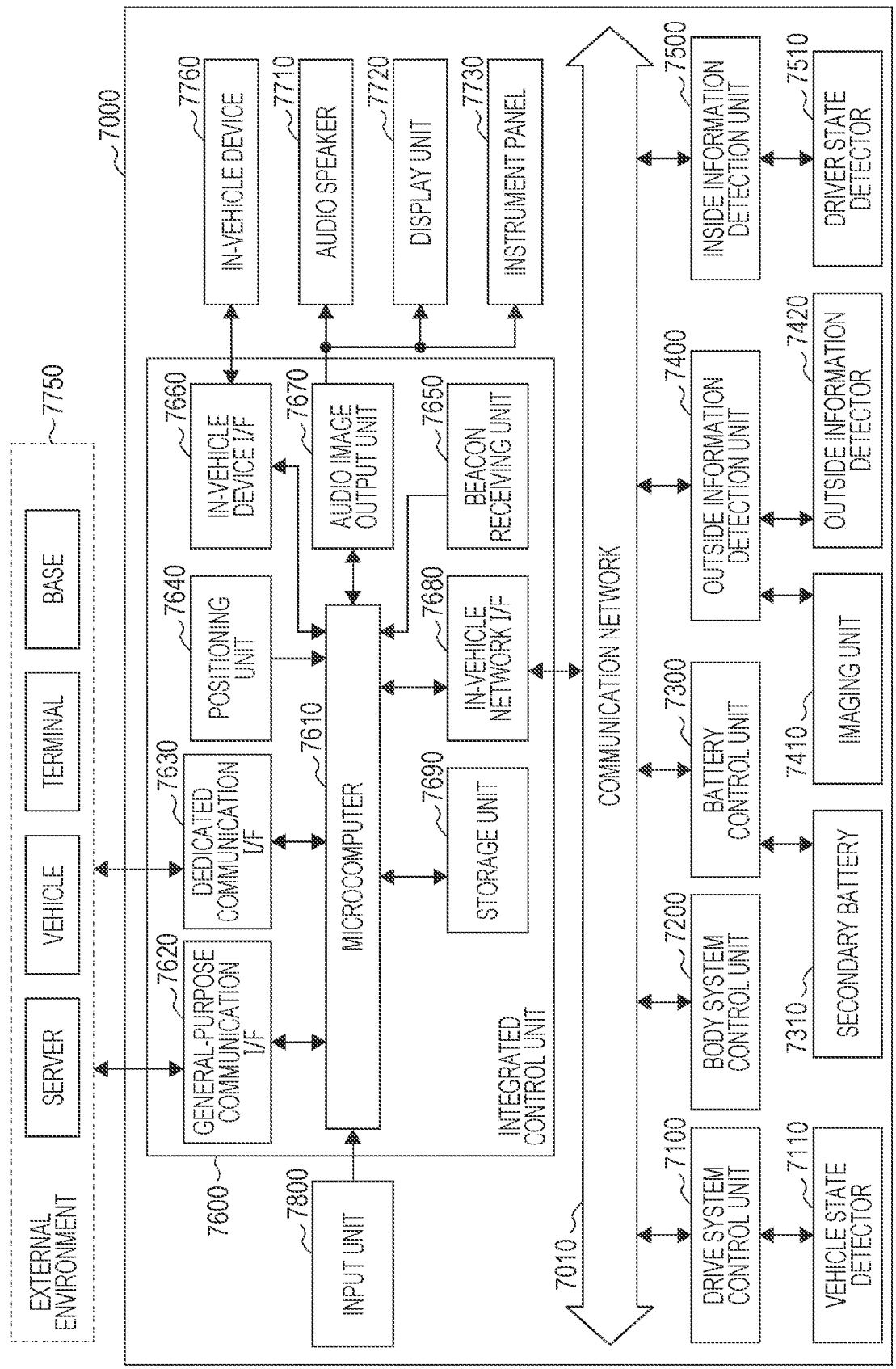
FIG. 13 is a block diagram showing a schematic configuration example of a vehicle control system which is an example of a mobile control system to which the technology according to the present disclosure can be applied.

FIG. 13 is a block diagram showing a schematic configuration example of a vehicle control system 7000 which is an example of a mobile control system to which the technology according to the present disclosure can be applied. The vehicle control system 7000 includes multiple electronic control units connected through a communication network 7010. In the example shown in FIG. 13, the vehicle control system 7000 includes a drive system control unit 7100, a body system control unit 7200, a battery control unit 7300, an outside information detection unit 7400, an inside information detection unit 7500, and an integrated control unit 7600. The communication network 7010 connecting the multiple control units may be an on-vehicle communication network compliant with an arbitrary standard such as controller area network (CAN), local interconnect network (LIN), local area network (LAN), and FlexRay (registered trademark), for example.

Each control unit includes a microcomputer that performs arithmetic processing according to various programs, a storage unit that stores a program executed by the microcomputer or parameters used for various arithmetic operations, and a drive circuit that drives various devices to be controlled. Each control unit includes a network I/F for communicating with other control units through the communication network 7010, and a communication I/F for communicating with devices, sensors, or the like inside or outside the vehicle by wired communication or wireless communication. In FIG. 13, as the functional configuration of the integrated control unit 7600, a microcomputer 7610, a general-purpose communication I/F 7620, a dedicated communication I/F 7630, a positioning unit 7640, a beacon receiving unit 7650, an in-vehicle device I/F 7660, an audio image output unit 7670, an in-vehicle network I/F 7680, and a storage unit 7690 are illustrated. The other control units similarly include a microcomputer, a communication I/F, a storage unit, and the like.

The drive system control unit 7100 controls the operation of devices related to the drive system of the vehicle according to various programs. For example, the drive system control unit 7100 functions as a controller of a drive force generation device for generating a drive force of a vehicle such as an internal combustion engine or a drive motor, a drive force transmission mechanism for transmitting the drive force to wheels, a steering mechanism that adjusts the steering angle of the vehicle, a braking device that generates a braking force of the vehicle, and the like. The drive system control unit 7100 may have a function as a controller of an antilock brake system (ABS), an electronic stability control (ESC), or the like.

A vehicle state detector 7110 is connected to the drive system control unit 7100. The vehicle state detector 7110 includes, for example, at least one of a gyro sensor that detects the angular velocity of the shaft rotational movement of the vehicle body, an acceleration sensor that detects the acceleration of the vehicle, or a sensor for detecting an accelerator pedal operation amount, a brake pedal operation amount, a steering wheel steering angle, an engine speed, a wheel rotation speed, or the like. The drive system control unit 7100 performs arithmetic processing using a signal input from the vehicle state detector 7110 to control an internal combustion engine, a drive motor, an electric power steering device, a brake device, or the like.

The body system control unit 7200 controls the operation of various devices equipped on the vehicle body according to various programs. For example, the body system control unit 7200 functions as a controller of a keyless entry system, a smart key system, a power window device, or various lamps such as a headlamp, a back lamp, a brake lamp, a blinker, or a fog lamp. In this case, the body system control unit 7200 may receive input of radio waves transmitted from a portable device substituting for a key or signals of various switches. The body system control unit 7200 receives input of these radio waves or signals, and controls a door lock device, a power window device, a lamp, and the like of the vehicle.

The battery control unit 7300 controls a secondary battery 7310 that is the power supply source of the drive motor according to various programs. For example, the battery control unit 7300 receives input of information such as the battery temperature, the battery output voltage, or the remaining capacity of the battery from a battery device including the secondary battery 7310. The battery control unit 7300 performs arithmetic processing using these signals to control the temperature adjustment of the secondary battery 7310 or control a cooling device or the like provided in the battery device.

The outside information detection unit 7400 detects information outside the vehicle equipped with the vehicle control system 7000. For example, at least one of an imaging unit 7410 or an outside information detector 7420 is connected to the outside information detection unit 7400. The imaging unit 7410 includes at least one of a time of flight (ToF) camera, a stereo camera, a monocular camera, an infrared camera, or other cameras. The outside information detector 7420 includes at least one of an environment sensor for detecting the current weather, or an ambient information detection sensor for detecting another vehicle, an obstacle, a pedestrian, or the like around the vehicle equipped with the vehicle control system 7000, for example.

The environment sensor may be at least one of a raindrop sensor that detects rainy weather, a fog sensor that detects fog, a sunshine sensor that detects the degree of sunshine, or a snow sensor that detects snowfall, for example. The ambient information detection sensor may be at least one of an ultrasonic sensor, a radar device, or a light detection and ranging or laser imaging detection and ranging (LIDAR) device. The imaging unit 7410 and the outside information detector 7420 may be provided as independent sensors or devices, or may be provided as a device in which multiple sensors or devices are integrated.

Figure 14:
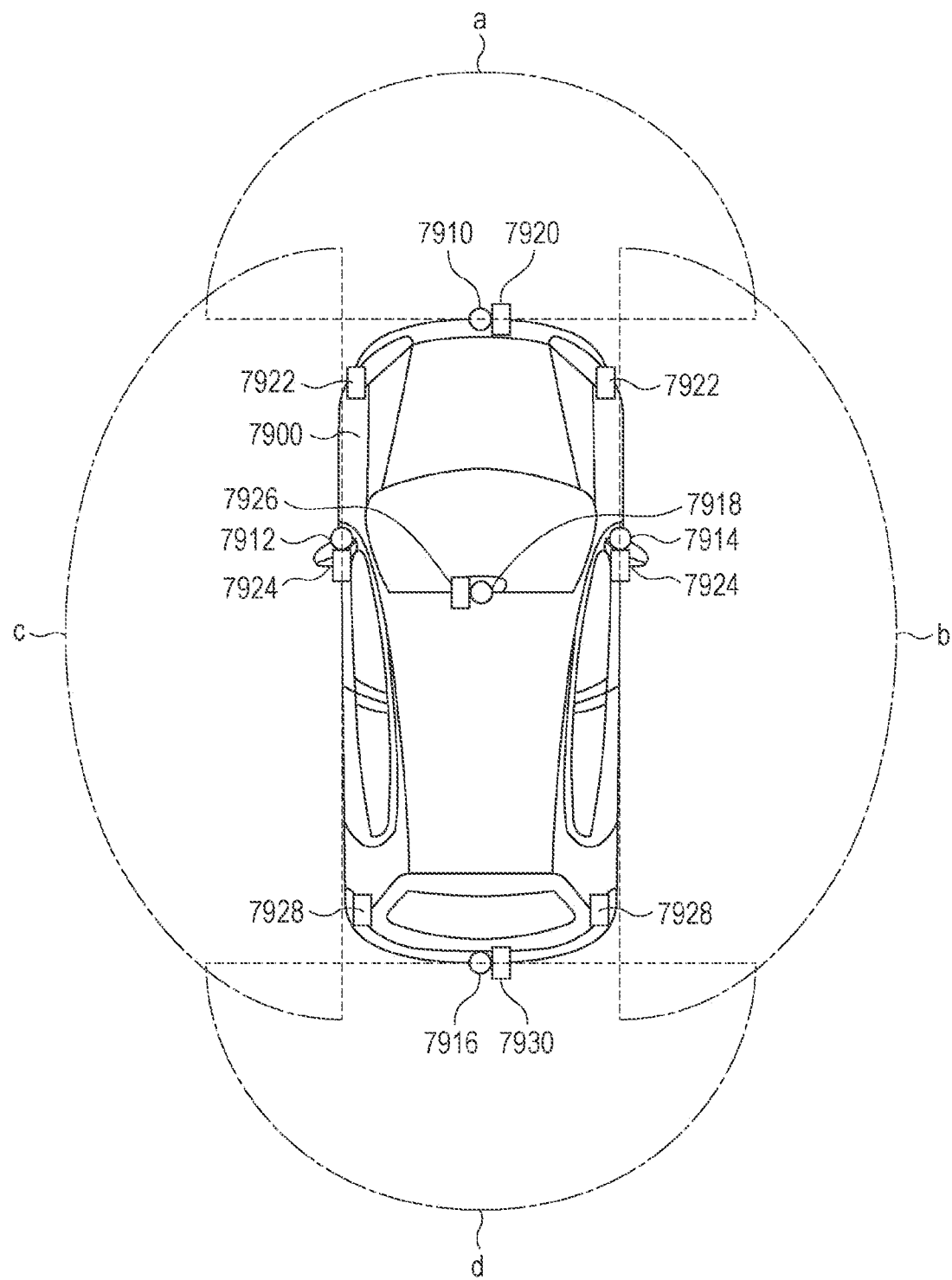
FIG. 14 is a diagram showing an example of installation positions of an imaging unit and an outside information detection unit in a mobile control system.

Here, FIG. 14 shows an example of the installation positions of the imaging unit 7410 and the outside information detector 7420. For example, imaging units 7910, 7912, 7914, 7916, and 7918 are provided in at least one of positions of a front nose, a side mirror, a rear bumper, a back door, or an upper portion of a windshield in the vehicle interior of a vehicle 7900. The imaging unit 7910 provided on the front nose and the imaging unit 7918 provided on the upper portion of the windshield in the vehicle interior mainly acquire images of the front of the vehicle 7900. The imaging units 7912 and 7914 provided on the side mirrors mainly acquire images of the sides of the vehicle 7900. The imaging unit 7916 provided on the rear bumper or the back door mainly acquires an image of the rear of the vehicle 7900. The imaging unit 7918 provided on the upper portion of the windshield in the vehicle interior is mainly used to detect a preceding vehicle, or a pedestrian, an obstacle, a traffic light, a traffic sign, a lane, or the like.

Note that FIG. 14 shows an example of the imaging ranges of the imaging units 7910, 7912, 7914, and 7916. An imaging range a indicates the imaging range of the imaging unit 7910 provided on the front nose, imaging ranges b and c indicate the imaging ranges of the imaging units 7912 and 7914 provided on the side mirrors, respectively, and an imaging range d indicates the imaging range of the imaging unit 7916 provided on the rear bumper or the back door. For example, by superimposing the pieces of image data captured by the imaging units 7910, 7912, 7914, and 7916, a bird's eye view image of the vehicle 7900 as viewed from above can be obtained.

Outside information detection parts 7920, 7922, 7924, 7926, 7928, and 7930 provided on the front, rear, sides, corners, and the upper portion of the windshield in the vehicle interior of the vehicle 7900 may be ultrasonic sensors or radar devices, for example. The outside information detection parts 7920, 7926, and 7930 provided on the front nose, the rear bumper, the back door, and the upper portion of the windshield in the vehicle interior of the vehicle 7900 may be LIDAR devices, for example. These outside information detection parts 7920 to 7930 are mainly used for detecting a preceding vehicle, a pedestrian, an obstacle, or the like.

Returning to FIG. 13, the description will be continued. The outside information detection unit 7400 causes the imaging unit 7410 to capture an image of the outside of the vehicle, and receives the captured image data. Additionally, the outside information detection unit 7400 receives detection information from the outside information detector 7420 connected thereto. In a case where the outside information detector 7420 is an ultrasonic sensor, a radar device, or a LIDAR device, the outside information detection unit 7400 causes transmission of ultrasonic waves, electromagnetic waves, or the like, and receives information on the received reflected waves. The outside information detection unit 7400 may perform object detection processing or distance detection processing of a person, a vehicle, an obstacle, a sign, characters on a road surface, or the like on the basis of the received information. The outside information detection unit 7400 may perform environment recognition processing for recognizing rainfall, fog, road surface conditions, or the like on the basis of the received information. The outside information detection unit 7400 may calculate the distance to the object outside the vehicle on the basis of the received information.

Additionally, the outside information detection unit 7400 may perform image recognition processing or distance detection processing of recognizing a person, a vehicle, an obstacle, a sign, characters on a road surface, or the like on the basis of the received image data. The outside information detection unit 7400 may perform processing such as distortion correction or position adjustment on the received image data, combine pieces of image data captured by different imaging units 7410, and generate a bird's eye view image or a panoramic image. The outside information detection unit 7400 may perform viewpoint conversion processing using pieces of image data captured by different imaging units 7410.

The inside information detection unit 7500 detects information inside the vehicle. For example, a driver state detector 7510 that detects a state of a driver is connected to the inside information detection unit 7500. The driver state detector 7510 may include a camera that images the driver, a biometric sensor that detects biometric information of the driver, a microphone that collects voice in the vehicle interior, and the like. For example, the biometric sensor is provided on a seat surface, a steering wheel, or the like, and detects biometric information of an occupant sitting in a seat or a driver who grips the steering wheel. The inside information detection unit 7500 may calculate the degree of fatigue or concentration of the driver or determine whether or not the driver is asleep, on the basis of detection information input from the driver state detector 7510. The inside information detection unit 7500 may perform processing such as noise canceling processing on the collected audio signal.

The integrated control unit 7600 controls overall operations in the vehicle control system 7000 according to various programs. An input unit 7800 is connected to the integrated control unit 7600. The input unit 7800 is implemented by a device such as a touch panel, a button, a microphone, a switch, or a lever on which an occupant can perform input operation, for example. The integrated control unit 7600 may receive input of data obtained by voice recognition of voice input by a microphone. The input unit 7800 may be a remote control device using infrared rays or other radio waves, or an external connection device such as a mobile phone or a personal digital assistant (PDA) compatible with the operation of the vehicle control system 7000, for example. The input unit 7800 may be a camera, for example, in which case the occupant can input information by gesture. Alternatively, data obtained by detecting the movement of a wearable device worn by the occupant may be input. Moreover, the input unit 7800 may include an input control circuit or the like that generates an input signal on the basis of information input by the occupant or the like using the above input unit 7800, and outputs the input signal to the integrated control unit 7600, for example. By operating the input unit 7800, the occupant or the like inputs various data or instructs the vehicle control system 7000 on a processing operation.

The storage unit 7690 may include a read only memory (ROM) that stores various programs executed by the microcomputer, and a random access memory (RAM) that stores various parameters, calculation results, sensor values, or the like. Additionally, the storage unit 7690 may be implemented by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. The general-purpose communication I/F 7620 may implement a cellular communication protocol such as global system of mobile communications (GSM) (registered trademark), WiMAX, long term evolution (LTE), or LTE-advanced (LTE-A), or another wireless communication protocol such as wireless LAN (also referred to as Wi-Fi (registered trademark)) or Bluetooth (registered trademark). For example, the general-purpose communication I/F 7620 may connect to a device (e.g., application server or control server) existing in an external network (e.g., Internet, cloud network, or network unique to business operator) through a base station or an access point. Additionally, for example, the general-purpose communication I/F 7620 may connect with a terminal (e.g., terminal of driver, pedestrian, or store, or machine type communication (MTC) terminal) existing in the vicinity of the vehicle by using the peer to peer (P2P) technology.

The dedicated communication I/F 7630 is a communication I/F that supports a communication protocol designed for use in a vehicle. The dedicated communication I/F 7630 may implement wireless access in vehicle environment (WAVE), which is a combination of the lower layer IEEE802.11p and the upper layer IEEE1609, dedicated short range communications (DSRC), or a standard protocol such as a cellular communication protocol, for example. The dedicated communication I/F 7630 performs V2X communication, which is a concept that typically includes one or more of vehicle to vehicle communication, vehicle to infrastructure communication, vehicle to home communication, and vehicle to pedestrian communication.

For example, the positioning unit 7640 receives a global navigation satellite system (GNSS) signal from a GNSS satellite (e.g., global positioning system (GPS) signal from GPS satellite) to perform positioning and generate position information including the latitude, longitude, and altitude of the vehicle. Note that the positioning unit 7640 may identify the current position by exchanging signals with a wireless access point, or may acquire position information from a terminal such as a mobile phone, a PHS, or a smartphone having a positioning function.

The beacon receiving unit 7650 receives radio waves or electromagnetic waves transmitted from a radio station or the like installed on the road, and acquires information such as current location, traffic congestion, traffic restrictions, or required time, for example. Note that the function of the beacon receiving unit 7650 may be included in the dedicated communication I/F 7630 described above.

The in-vehicle device I/F 7660 is a communication interface that mediates connection between the microcomputer 7610 and various in-vehicle devices 7760 existing in the vehicle. The in-vehicle device I/F 7660 may establish a wireless connection using a wireless LAN, Bluetooth (registered trademark), or a wireless communication protocol such as near field communication (NFC) or Wireless USB (WUSB). Additionally, the in-vehicle device I/F 7660 may establish a wired connection such as universal serial bus (USB), high-definition multimedia interface (HDMI) (registered trademark), mobile high-definition link (MHL), or the like through a connection terminal (and, if necessary, a cable) not shown. The in-vehicle device 7760 may include at least one of a mobile device or a wearable device that an occupant owns, or an information device that is carried in or attached to the vehicle, for example. Additionally, the in-vehicle device 7760 may include a navigation device that searches for a route to an arbitrary destination. The in-vehicle device I/F 7660 exchanges control signals or data signals with these in-vehicle devices 7760.

The in-vehicle network I/F 7680 is an interface that mediates communication between the microcomputer 7610 and the communication network 7010. The in-vehicle network I/F 7680 transmits and receives signals and the like according to a predetermined protocol supported by the communication network 7010.

The microcomputer 7610 of the integrated control unit 7600 controls the vehicle control system 7000 according to various programs, on the basis of information acquired through at least one of the general-purpose communication I/F 7620, the dedicated communication I/F 7630, the positioning unit 7640, the beacon receiving unit 7650, the in-vehicle device I/F 7660, or the in-vehicle network I/F 7680. For example, the microcomputer 7610 may calculate a control target value of the drive force generation device, the steering mechanism, or the braking device on the basis of acquired information on the inside and outside of the vehicle, and output a control command to the drive system control unit 7100. For example, the microcomputer 7610 may perform coordinated control aimed to achieve functions of an advanced driver assistance system (ADAS) including collision avoidance or shock mitigation of the vehicle, follow-up traveling based on an inter-vehicle distance, vehicle speed maintenance traveling, vehicle collision warning, vehicle lane departure warning, or the like. Additionally, the microcomputer 7610 may control the drive force generation device, the steering mechanism, the braking device, or the like on the basis of acquired information on the surroundings of the vehicle, to perform coordinated control aimed for automatic driving of traveling autonomously without depending on the driver's operation, for example.

The microcomputer 7610 may generate, on the basis of information acquired through at least one of the general-purpose communication I/F 7620, the dedicated communication I/F 7630, the positioning unit 7640, the beacon receiving unit 7650, the in-vehicle device I/F 7660, or the in-vehicle network I/F 7680, three-dimensional distance information between the vehicle and objects such as surrounding structures and persons, and create local map information including peripheral information of the current position of the vehicle. Additionally, the microcomputer 7610 may predict a risk of a vehicle collision, proximity of a pedestrian or the like, or entry into a closed road, for example, on the basis of the acquired information, and generate a warning signal. The warning signal may be a signal for sounding a warning sound or lighting a warning lamp, for example.

The audio image output unit 7670 transmits an output signal of at least one of audio or image to an output device capable of visually or aurally giving notification of information to an occupant or to the outside of the vehicle. In the example of FIG. 13, an audio speaker 7710, a display unit 7720, and an instrument panel 7730 are shown as examples of the output device. The display unit 7720 may include at least one of an onboard display or a head-up display, for example. The display unit 7720 may have an augmented reality (AR) display function. The output device may be a device other than these devices, such as headphones, a wearable device such as an eyeglass-type display worn by an occupant, a projector, or a lamp. In a case where the output device is a display device, the display device visually displays results obtained by various processing performed by the microcomputer 7610 or information received from another control unit in various formats such as text, images, tables, and graphs. Additionally, in a case where the output device is a voice output device, the voice output device converts an audio signal including reproduced voice data, acoustic data, or the like into an analog signal and outputs the analog signal in an auditory manner.

Note that in the example shown in FIG. 13, at least two control units connected through the communication network 7010 may be integrated as one control unit. Alternatively, each control unit may include multiple control units. Moreover, the vehicle control system 7000 may include another control unit not shown. Additionally, in the above description, some or all of the functions of any control unit may be given to another control unit. That is, as long as information is transmitted and received through the communication network 7010, the predetermined arithmetic processing may be performed by any control unit. Similarly, a sensor or device connected to one of the control units may be connected to another control unit, and multiple control units may transmit and receive detection information to and from each other through the communication network 7010.

Hereinabove, an example of the vehicle control system to which the technology of the present disclosure can be applied has been described. Of the above-described configuration, the technology according to the present disclosure is applicable to a ToF camera in a case where the imaging unit 7410 includes the ToF camera, for example. Then, by applying the technology according to the present disclosure, the peak power during a sampling operation for distance measurement can be reduced, so that a vehicle control system with low power consumption can be constructed, for example.

<Conceivable Configuration of Present Disclosure>

Note that the present technology can also be configured as follows.

<<A. Photodetector>>

[A-1] A photodetector including
multiple pixels including a light receiving element, and
a sampling circuit that is provided corresponding to the multiple pixels, and samples light reception data output from the pixel on the basis of multiple clock signals having different phases, in synchronization with input of a trigger signal, in which
the sampling circuit performs a sampling operation on the basis of a clock signal having a different phase every time a trigger signal is input.

[A-2] The photodetector according to [A-1] above, in which
the sampling circuit has a latch circuit that performs a sampling operation of light reception data on the basis of a clock signal having a different phase every time a trigger signal is input.

[A-3] The photodetector according to [A-2] above, in which
the sampling circuit has multiple latch circuits provided corresponding to the phases of the multiple clock signals, and
the multiple latch circuits perform a sampling operation of light reception data in turns, every time a trigger signal is input.

[A-4] The photodetector according to [A-2] above, in which
the sampling circuit has a single latch circuit commonly provided for the phases of the multiple clock signals, and
the single latch circuit performs a sampling operation of light reception data in turns for each phase of the multiple clock signals.

[A-5] The photodetector according to [A-4] above, in which
the sampling circuit has a selector circuit that selects from the multiple clock signals for each phase and supplies the clock signal to the single latch circuit.

[A-6] The photodetector according to [A-2] above, in which
the sampling circuit has a single latch circuit commonly provided for the phases of the multiple clock signals, and
the single latch circuit performs a sampling operation of light reception data in turns for each phase of the multiple clock signals by using the light reception data of multiple pixels as a unit.

[A-7] The photodetector according to [A-6] above, in which
the sampling circuit has a selector circuit that selects from the multiple clock signals for each phase and supplies the clock signal to the single latch circuit by using the light reception data of multiple pixels as a unit.

[A-8] The photodetector according to any one of [A-1] above to [A-7] above, in which
the light receiving element includes an element that generates a signal in response to reception of a photon.

[A-9] The photodetector according to [A-8] above, in which
the light receiving element includes a single photon avalanche diode.

<<B. Distance Measuring Device>>

[B-1] A distance measuring device including
a light source that irradiates an object to be measured with light, and
a light receiving device that receives light reflected by the object to be measured, in which
the light receiving device includes multiple pixels including a light receiving element, and a sampling circuit that samples light reception data output from the pixel on the basis of multiple clock signals having different phases, and
the sampling circuit performs a sampling operation on the basis of a clock signal having a different phase every time a trigger signal is input.

[B-2] The distance measuring device according to [B-1] above, in which
the sampling circuit has a latch circuit that performs a sampling operation of light reception data on the basis of a clock signal having a different phase every time a trigger signal is input.

[B-3] The distance measuring device according to [B-2] above, in which
the sampling circuit has multiple latch circuits provided corresponding to the phases of the multiple clock signals, and
the multiple latch circuits perform a sampling operation of light reception data in turns, every time a trigger signal is input.

[B-4] The distance measuring device according to [B-2] above, in which
the sampling circuit has a single latch circuit commonly provided for the phases of the multiple clock signals, and
the single latch circuit performs a sampling operation of light reception data in turns for each phase of the multiple clock signals.

[B-5] The distance measuring device according to [B-4] above, in which the sampling circuit has a selector circuit that selects from the multiple clock signals for each phase and supplies the clock signal to the single latch circuit.

[B-6] The distance measuring device according to [B-2] above, in which
the sampling circuit has a single latch circuit commonly provided for the phases of the multiple clock signals, and
the single latch circuit performs a sampling operation of light reception data in turns for each phase of the multiple clock signals by using the light reception data of multiple pixels as a unit.

[B-7] The distance measuring device according to [B-6] above, in which
the sampling circuit has a selector circuit that selects from the multiple clock signals for each phase and supplies the clock signal to the single latch circuit by using the light reception data of multiple pixels as a unit.

[B-8] The distance measuring device according to any one of [B-1] above to [B-7] above, in which
the light receiving element includes an element that generates a signal in response to reception of a photon.

[B-9] The distance measuring device according to [B-8] above, in which
the light receiving element includes a single photon avalanche diode.

REFERENCE SIGNS LIST

1 Distance measuring device
10 Subject (object to be measured)
20 Light source
21 Laser driver
22 Laser light source
23 Diffusing lens
30 Photodetector
31 Light receiving lens
32 Optical sensor
33 Signal processing circuit
34 Control circuit
40 Pixel
41 SPAD sensor
51 First signal processing unit
52 Second signal processing unit
60 Sampling circuit
61 Latch circuit
62 Selector circuit
611, 612 Flip-flop

The invention claimed is:

1. A photodetector, comprising
a plurality of pixels, wherein
each pixel of the plurality of pixels comprises a light receiving element, and
a pixel of the plurality of pixels is configured to output light reception data;
a control circuit configured to receive a trigger signal; and
a sampling circuit corresponding to the plurality of pixels, wherein the sampling circuit is configured to sample the light reception data based on a plurality of clock signals having different phases, in synchronization with the received trigger signal, wherein
the sampling circuit comprises a latch circuit,
the latch circuit is configured to sample the light reception data, based on a clock signal having a different phase every time the trigger signal is received, and
the plurality of clock signals comprises the clock signal.

2. The photodetector according to claim 1, wherein
the sampling circuit further comprises a plurality of latch circuits,
the plurality of latch circuits comprises the latch circuit,
the plurality of latch circuits corresponds to the plurality of clock signals having different phases, and
latch circuits in the plurality of latch circuits are configured to sample the light reception data in turns, every time the trigger signal is received.

3. The photodetector according to claim 1, wherein
the latch circuit comprises a single latch circuit common for the plurality of clock signals having different phases, and
the single latch circuit is configured to sample the light reception data for each clock signal of the plurality of clock signals having different phases.

4. The photodetector according to claim 3, wherein
the sampling circuit further comprises a selector circuit, and
the selector circuit is configured to:
select the clock signal from the plurality of clock signals; and
supply the selected clock signal to the single latch circuit.

5. The photodetector according to claim 1, wherein
the latch circuit comprises a single latch circuit common for the plurality of clock signals having different phases, and
the single latch circuit is configured to sample light reception data of at least two pixels of the plurality of pixels, for each clock signal of the plurality of clock signals having different phases.

6. The photodetector according to claim 5, wherein
the sampling circuit further comprises a selector circuit, and
the selector circuit is configured to:
select the clock signal from the plurality of clock signals; and
supply the selected clock signal to the single latch circuit.

7. The photodetector according to claim 1, wherein the light receiving element is configured to:
receive a photon; and
generate a signal based on the received photon.

8. The photodetector according to claim 7, wherein the light receiving element comprises a single photon avalanche diode.

9. A driving method of a photodetector, the method comprising:
in the photodetector that comprises a plurality of pixels, a sampling circuit corresponding to the plurality of pixels, and a control circuit, wherein each pixel of the plurality of pixels comprises a light receiving element:
outputting, by a pixel of the plurality of pixels, output light reception data;
receiving, by the control circuit, a trigger signal;
sampling, by the sampling circuit, the light reception data based on a plurality of clock signals having different phases, in synchronization with the received trigger signal, wherein the sampling circuit comprises a latch circuit; and
sampling, by the latch circuit, the light reception data based on a clock signal having a different phase every time the trigger signal is received, wherein the plurality of clock signals comprises the clock signal.

10. A distance measuring device, comprising:
a light source configured to irradiate an object with a first light; and
a light receiving device configured to receive a second light reflected by the object, wherein
the light receiving device comprises:
a plurality of pixels, wherein
each pixel of the plurality of pixels comprises a light receiving element, and
a pixel of the plurality of pixels is configured to output light reception data,
a control circuit configured to receive a trigger signal; and
a sampling circuit configured to sample the light reception data based on a plurality of clock signals having different phases, in synchronization with the received trigger signal, wherein
the sampling circuit comprises a latch circuit,
the latch circuit is configured to sample the light reception data, based on a clock signal having a different phase every time the trigger signal is received, and
the plurality of clock signals comprises the clock signal.

* * * * *